(12) United States Patent
Philp

(10) Patent No.: US 7,349,419 B1
(45) Date of Patent: Mar. 25, 2008

(54) QUEUE SIZING FOR PACKET ROUTING

(75) Inventor: Ian R. Philp, Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 1039 days.

(21) Appl. No.: 10/331,206

(22) Filed: Dec. 30, 2002

Related U.S. Application Data

(60) Provisional application No. 60/354,992, filed on Feb. 8, 2002.

(51) Int. Cl.
*H04L 12/56* (2006.01)

(52) U.S. Cl. .................. 370/414; 370/417; 370/429; 710/310

(58) Field of Classification Search .......... 370/395.51, 370/395.61, 412, 395.4, 395.41, 395.42, 370/395.43, 468, 414, 417, 428, 429; 710/310
See application file for complete search history.

(56) References Cited

U.S. PATENT DOCUMENTS

| | | | |
|---|---|---|---|
| 5,491,801 A * | 2/1996 | Jain et al. ................ 709/241 |
| 5,521,916 A * | 5/1996 | Choudhury et al. ......... 370/414 |
| 5,631,694 A * | 5/1997 | Aggarwal et al. ........... 725/93 |
| 6,424,622 B1 * | 7/2002 | Fan et al. ................ 370/230 |
| 6,526,504 B1 * | 2/2003 | Veazey et al. ............... 713/1 |
| 7,136,392 B2 * | 11/2006 | Wentink ................... 370/445 |

OTHER PUBLICATIONS

Irland, "Buffer Management in a Packet Switch", Mar. 1978, IEEE Transactions on Communications, vol. 26, p. 328-337.*

* cited by examiner

*Primary Examiner*—Hassan Kizou
*Assistant Examiner*—Brian T O'Connor
(74) *Attorney, Agent, or Firm*—Withrow & Terranova, PLLC

(57) ABSTRACT

The present invention relates to determining a queue size for a network router based on the number of voice channels capable of being handled by a particular output link and a desired failure probability for transmitting voice information over that output link. Since it is infeasible to use statistics to calculate the actual queue size, the queue size is approximated as follows. First, an initial queue size is determined based on the desired failure probability and a number of voice channels that is lower than the desired number of channels. This initial number of voice channels is within a range in which the queue, based on the desired failure probability, is calculated. From the initial queue size, the desired queue size is calculated by multiplying the initial queue size by a function that is a ratio of the desired number of voice channels to the initial number of voice channels.

25 Claims, 5 Drawing Sheets

| SLOT NUMBER | 1 | 2 | 3 | 4 | 5 | 6 | 7 | 8 | 9 | 10 |
|---|---|---|---|---|---|---|---|---|---|---|

1 - 20 MS FRAME (PHASE OR SLOT ASSIGNMENT)

|   |   |   |   | 5 |   |   |   |   |   |
|---|---|---|---|---|---|---|---|---|---|
| 8 |   |   | 7 | 10 |   |   |   |   |   |
| 2 |   | 6 | 4 | 3 | 1 |   |   | 9 |   |

QUEUE CONTENTS

|   |   |   |   | 5 | 1 |   |   |   |   |
|---|---|---|---|---|---|---|---|---|---|
|   |   |   |   | 10 | 5 | 1 |   |   |   |
| 8 |   |   | 7 | 3 | 10 | 5 | 1 | 9 |   |
| 2 |   | 6 | 4 | 7 | 3 | 10 | 5 | 1 | 9 |

| TRANSMISSION SCHEDULE |  | 2 | 8 | 6 | 4 | 7 | 3 | 10 | 5 | 1 | 9 |
|---|---|---|---|---|---|---|---|---|---|---|---|

| DELAY |  | 1 | 2 | 1 | 1 | 2 | 2 | 3 | 4 | 4 | 2 |
|---|---|---|---|---|---|---|---|---|---|---|---|

FIG. 3

QUEUE SIZING FOR PACKET ROUTING

This application claims the benefit of U.S. provisional application Ser. No. 60/354,992, filed Feb. 8, 2002, the disclosure of which is incorporated herein by reference in its entirety.

FIELD OF THE INVENTION

The present invention relates to packet-based communications, and in particular to determining a queue size for routing packets used to carry voice-based information.

BACKGROUND OF THE INVENTION

Transporting voice over asynchronous transfer mode (ATM) or Internet Protocol (IP) based packet networks has several advantages compared to the predominant circuit-switched or Time-Division-Multiplexed (TDM) method. The ability to share the same physical network infrastructure with data traffic; increased network utilization due to statistical multiplexing of voice channels; the potential of creating new services; and the lower cost of voice achieved by using data-traffic-based commodity components are all strong motivations for moving voice to packet networks. However, the use of packet networks for carrying voice channels introduces larger delays, and more importantly, introduces the possibility of packet loss in network routers. Such packet loss may severely impair the quality of the voice conversation.

Designing a carrier-grade, voice solution for a packet network demands that the reliability and quality of voice conversation that has been achieved in the current circuit-switched Public Switched Telephone Network (PSTN) be equaled or exceeded. Practically, achieving this goal requires bounding the probability of any packet loss on a link to an extremely low value, such as a value less than $10^{-12}$. Bounding the packet loss rate is achieved by setting the router queues, or buffers, large enough so that no packet loss is expected. Unfortunately, setting the queue length to too large a value increases the cost of the router and results in over-estimation of the queuing delay, which may exceed telecommunications engineering requirements. Accordingly, there is a need for a way to determine a router's queue size to avoid packet loss and minimize the cost of the router.

SUMMARY OF THE INVENTION

The present invention relates to efficiently determining a queue size for a network router based on the number of voice channels capable of being handled by a particular output link and a desired failure probability for transmitting voice information over that output link. Since it is computationally infeasible to use statistics to calculate the actual queue size, the queue size is approximated as follows. First, an initial queue size is determined based on the desired failure probability and a number of voice channels that is significantly lower than the desired number of channels. This initial number of voice channels is within a range in which the queue, based on the desired failure probability, can be calculated. From the initial queue size, the desired queue size can be calculated by multiplying the initial queue size by a function that is a ratio of the desired number of voice channels to the initial number of voice channels. In particular, the initial queue size is multiplied by a root of the ratio of the desired number of voice channels to the initial number of voice channels, such that:

$$Q_{desired}(n,f) = Q_{initial}(m,f) * (n/m)^X, \quad \text{Eq. 1}$$

where $X<1$, n is equal to the desired number of voice channels, m is equal to the actual number of voice channels, and f represents the failure probability. Preferably, X is approximately 0.5, but optimal results are found when X is within a range of 0.3-0.7. This equation is most beneficial for packets that are uniformly received by a router for routing.

For environments where packets are not uniformly received, such as when the original voice information originated in a time division multiplexing (TDM) environment, such as the public switched telephone network (PSTN), the following equation is preferred for determining the desired queue size:

$$Q_{desired}(n,f) = Q_{initial}(m,f) * (n/m)^X + C(p_{tdm}/b_i), \quad \text{Eq. 2}$$

wherein C is a transmission capacity of the output link, $p_{tdm}$ is the period of a TDM frame, which is typically 125 µs, and $b_i$ is the number of bits in each packet. Thus, the present invention provides optimal queue sizing for the routing of voice information originating from packet- and TDM-based systems. The following outlines how these equations were derived, and provides beneficial guidelines for applying these equations in routers used in both IP- and ATM-based packet networks of different transmission capabilities.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 3 simulates queue operation and delay according to an exemplary simulation.

Figure 4:
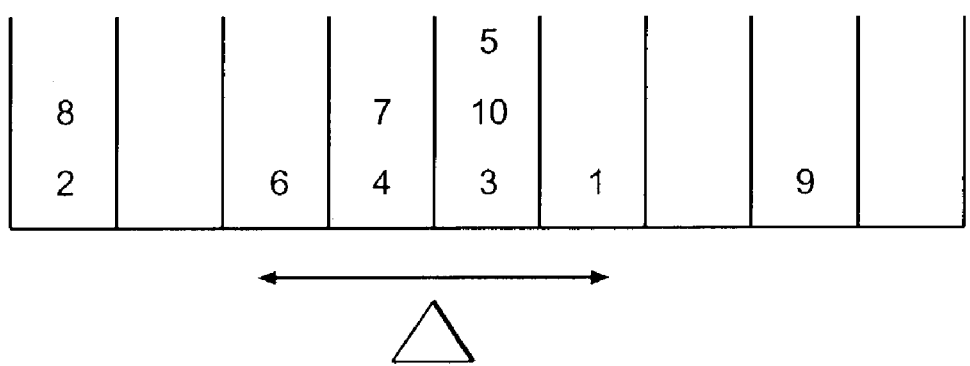

FIG. 4 represents the phase or slot assignment over a single frame according to the simulation of FIG. 3.

Figure 5:
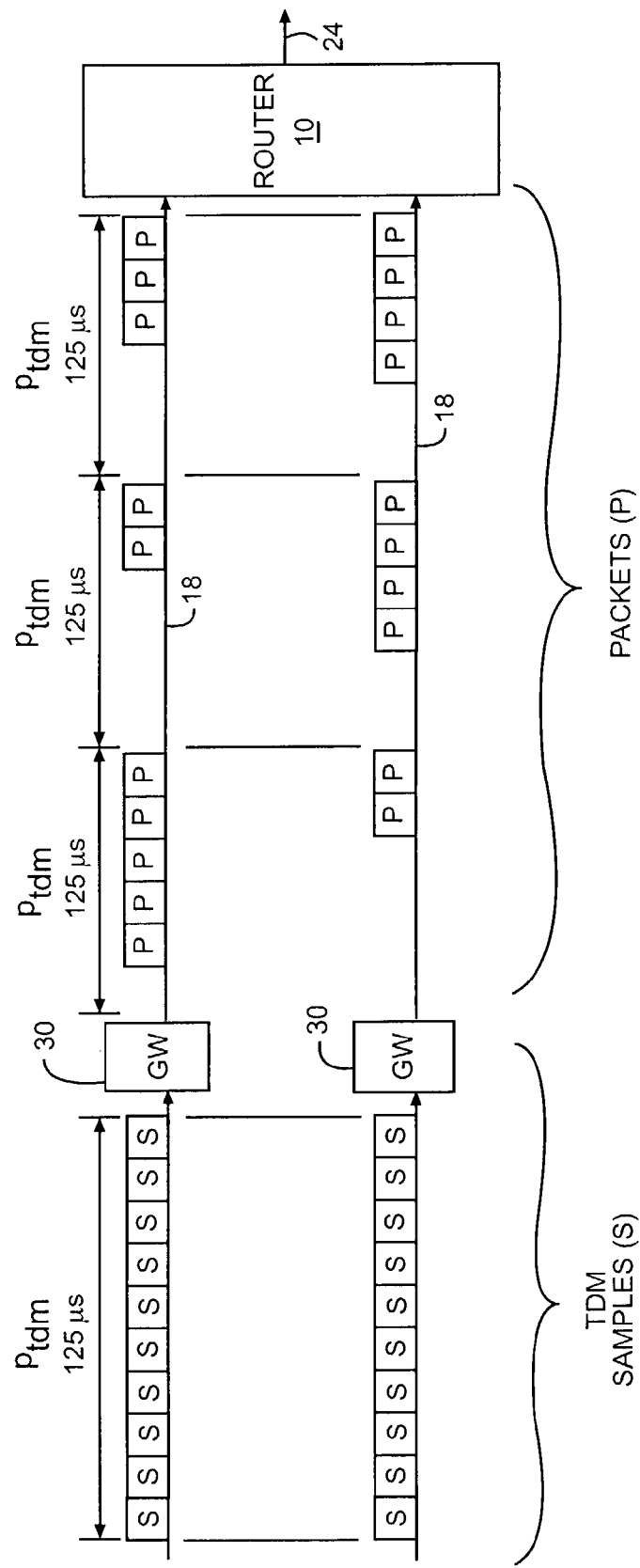

FIG. 5 illustrates a routing environment wherein voice information originates from a TDM system according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to efficiently determining a queue size for a network router based on the number of voice channels capable of being handled by a particular output link and a desired failure probability for transmitting voice information over that output link. Since it is computationally infeasible to use statistics to calculate the actual queue size, the queue size is approximated as follows. First, an initial queue size is determined based on the desired failure probability and a number of voice channels that is significantly lower than the desired number of channels. This initial number of voice channels is within a range in which the queue, based on the desired failure probability, can be calculated. From the initial queue size, the desired queue size can be calculated by multiplying the initial queue size by a function that is a ratio of the desired number of voice channels to the initial number of voice channels. In particular, the initial queue size is multiplied by a root of the ratio of the desired number of voice channels to the initial number of voice channels, such that:

$$Q_{desired}(n,f) = Q_{initial}(m,f)*(n/m)^X, \qquad \text{Eq. 1}$$

where X<1, n is equal to the desired number of voice channels, m is equal to the actual number of voice channels, and f represents the failure probability. Preferably, X is approximately 0.5, but optimal results are found when X is within a range of 0.3-0.7. This equation is most beneficial for packets that are uniformly received by a router for routing.

For environments where packets are not uniformly received, such as when the original voice information originated in a time division multiplexing (TDM) environment, such as the public switched telephone network (PSTN), the following equation is preferred for determining the desired queue size:

$$Q_{desired}(n,f) = Q_{initial}(m,f)*(n/m)^X + C(p_{tdm}/b_i), \qquad \text{Eq. 2}$$

wherein C is a transmission capacity of the output link, $p_{tdm}$ is the period of a TDM frame, which is typically 125 µs, and $b_i$ is the number of bits in each packet. Thus, the present invention provides optimal queue sizing for the routing of voice information originating from packet- and TDM-based systems. The following outlines how these equations were derived, and provides beneficial guidelines for applying these equations in routers used in both IP- and ATM-based packet networks of different transmission capabilities.

Figure 1:
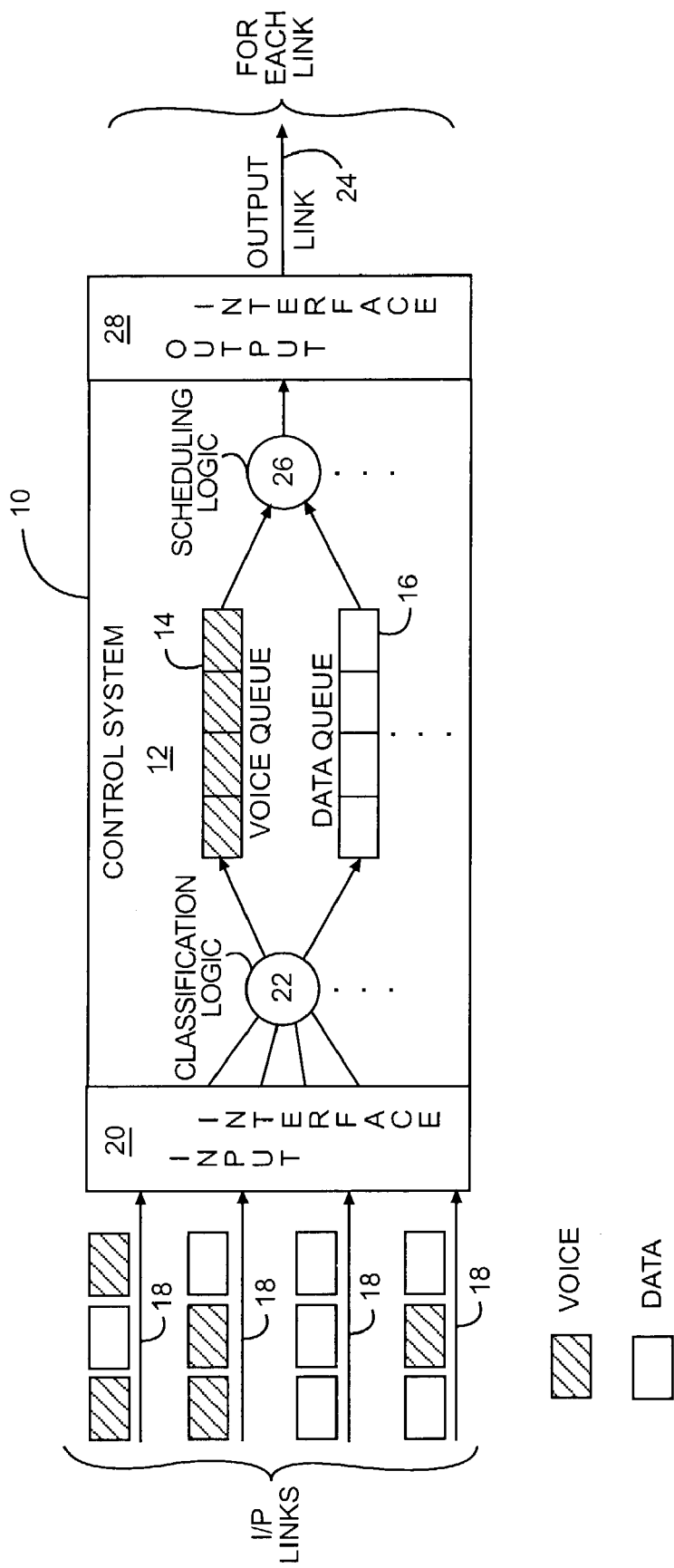
FIG. 1 is a block representation of a router according to one embodiment of the present invention.

In a voice-over-asynchronous transfer mode (VoATM) or voice-over-Internet Protocol (VoIP) solution, which is generally referred to as a voice-over-packet (VoP) solution, a common design is to separate voice and data traffic inside the switches or routers in the network, as illustrated in FIG. 1. For simplicity, the term router refers to any layer 2 or 3 device that makes routing decisions and contains a finite-size queue to buffer incoming packets during congested periods. For example, a router may be an IP router for routing IP packets or an ATM switch for routing ATM cells. As illustrated, a router 10 includes a control system 12 having distinct voice queues 14 and data queues 16. Various input links 18 carry voice and data packets to an input interface 20, which is associated with the control system 12. The control system 12 implements classification logic 22 to process the incoming packets on the various input links 18 and place them in the appropriate voice queue 14 or data queue 16, which are associated with an appropriate output link 24. Notably, each output link 24 is preferably associated with a single voice queue 14 and data queue 16, which is used to store packets to be transmitted over the output link 24. Thus, the classification logic 22 not only separates the voice and data packets, but determines to which voice queue 14 or data queue 16 the packets should be sent, based on the next hop or intended destination for the packet, and thus, also determines the output link 24. Further, scheduling logic 26 is used to select queued packets and transmit them over the output link 24 via an output interface 28.

Through the use of Differentiated Services and over provisioning on one of the explicit call setup procedures such as Resource Reservation Protocol (RSVP), Constraint-based Routing Multiple Protocol Label Switching (MPLS-CR), or ATM signaling User-to-Network Interface (UNI), the system ensures that the utilization of the voice traffic on any link is not more than 100%. Using one of the above methods, a voice packet is identified by information in the packet header and is buffered in a voice queue 14. At the output link 24, the scheduling logic 26 is typically configured to transmit data packets only when there are no packets in the voice queue 14. In other words, voice packets get absolute priority over data packets on the output link 24. The voice packets are transmitted in a first come first served (FCFS) order. In this model, data traffic has almost no effect on voice traffic. The only data-traffic-induced delay a voice packet can experience is when it arrives into an empty voice queue 14 during the transmission of a data packet and has to wait for the duration of that data packet's transmission. On high-speed transmission links, this delay is typically negligible.

While there has been a lot of work in defining coder/decoders (codecs) for converting analog voice to a digital signal and vice versa, the standard codec in use for wireline voice in North America is G.711. G.711 produces a constant-bit-rate (CBR) 64 kbps signal based on 8-bit samples every 125 µs. In an ATM network, which has a fixed-size packet called a cell, 48 samples are included in each 48-byte payload and a single ATM cell is emitted approximately every 6 ms. In reality, 47 samples are combined when using AAL/1, and the period is 5.875 ms; however, the more convenient 6 ms approximation is commonly used.

IP datagrams can be of variable lengths, so the number of samples included in each packet can vary, but in practice the payload size is typically fixed for the duration of the call. Common voice payload sizes are 80 and 160 bytes, resulting in a single packet emission every 10 ms and 20 ms, respectively. So in both ATM- and IP-based VoP solutions, when the voice traffic originates at a packet telephone it can be characterized as a constant-bit-rate, periodic series of fixed-size packet emissions.

Figure 2:
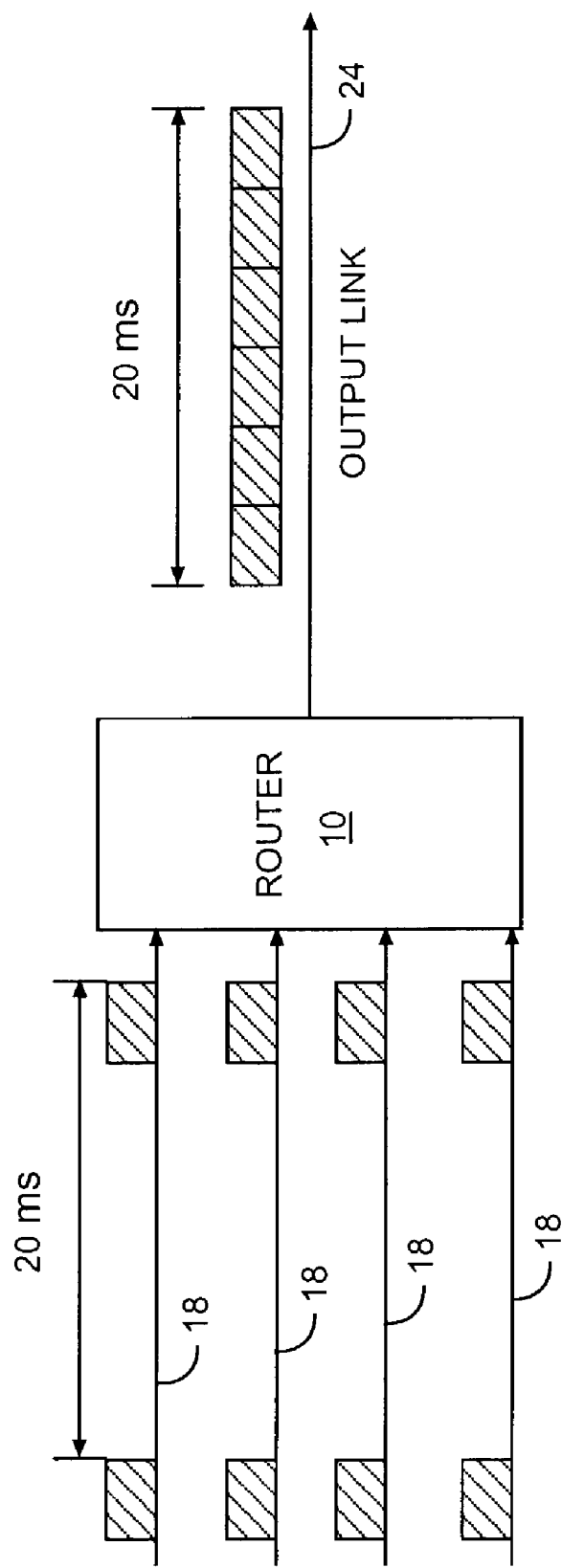
FIG. 2 illustrates a worst-case delay analysis according to the present invention.

As shown in FIG. 2, the worst-case delay through a router 10 for a periodic set of packet arrivals occurs when all the packets destined for a single output link 24 arrive simultaneously over multiple input links 18. One of the packets must be transmitted last, and when the output link 24 is run at 100% utilization the delay for the last packet is equal to the period of the voice channels. This is a well-known result in real-time scheduling theory and is true even for many non-FCFS schedulers. The worst-case queuing delay through a single ATM switch is therefore 6 ms, and the end-to-end delay through an ATM network with 15 hops is 6 ms*15=90 ms. Similarly, with VoIP packetization of 160 samples, the period is 20 ms, and the end-to-end queuing delay through 15 hops is 20 ms*15=300 ms. A well-established result in telecommunications engineering studies is that humans can tolerate a one-way total delay of 150 ms, which is the sum of all delays resulting from coding, packetizing, transmission, queuing, propagation, and decoding. The worst-case queuing delay of the IP solution exceeds this value, and the total delay of the ATM solution exceeds this value for most long-distance calls.

Although it is possible that all packets arrive at the same time and some packets experience the worst-case delay, in practical terms it is highly unlikely that this situation will occur. Instead, it is much more likely that the time at which a packet arrives at a router 10 is distributed throughout the period of the call. Thus, it is possible to assign the router queue length a value much lower than the worst case and still achieve near zero packet loss.

Despite the fact that modern decoders can achieve good voice quality for a voice channel experiencing 5-10% packet loss, this result cannot be interpolated to the packet loss rate on a link. Due to the periodic nature of the packet emissions, the state of the voice queues 14 in the routers 10 are likely to also exhibit periodic behavior. If a packet from a particular voice channel finds a voice queue 14 nearly empty or full it is likely that subsequent packets from that voice channel will also arrive when the voice queue 14 is nearly empty or full. This phenomenon is referred to as periodic packet loss (ppl). The result is that if any packet loss occurs in the voice queue 14, it is likely that all the loss will be concentrated on a small number of voice channels and the quality of the voice conversation for these channels will be unacceptable.

Periodic packet loss is highly undesirable in a telecommunications system. In the simplest case, a new call entering the system may go through the normal call setup steps including hearing ringing and remote user pickup, but then experience dead air. Worse yet, a call that is already in progress may transition from zero packet loss to intolerable packet loss with the addition of a single new call. The affected user may hang up, redial, and cause yet another in-progress call to go down in a cascading failure scenario. One technique for avoiding periodic packet loss is to avoid packet loss altogether. The central question is: how large a queue suffices so that one expects zero packet loss in an entire network over the period of one year? The acceptable failure rate on a single output link 24 is estimated using the following order-of-magnitude process. The number of callers in the system is between $10^8$ and $10^9$; each caller makes $10^2$ to $10^4$ calls per year; and each call traverses ten routers 10. The number of router-calls per year is therefore $10^{11}$ to $10^{14}$, and a failure rate per link of $10^{-12}$ to $10^{-15}$ will likely prevent the occurrence of any periodic packet loss throughout the system.

The packet emissions of voice channel I, is denoted by ($b_i$, $p_i$) where $b_i$ is the number of bits in each packet, including any headers, and $p_i$ is the period. The transmission capacity of the link is defined by C, and the time required to transmit a single packet of length $b_i$ is defined by $\tau = b_i/C$ and $N = C^* p_i/b_i$ is the number of voice channels that can be supported on a single output link 24. The link failure rate, f, of a router 10 on a particular output link 24 with queue length Q is defined as the probability that any packet loss will occur, where 1−f defines the probability that no packet loss will occur on the link.

To determine the required queue length, Q, and delays for a set of voice channels sharing a single output link 24 on a router 10, a direct simulation of the packet arrival pattern and the queue behavior is written. Assume that the time at which a packet arrives is random and uniformly distributed within the period, $p_i$ of the channel and that all channels have the same period. Also assume that all calls have the same packet size $b_i$, and that the router 10 is a store-and-forward device that can begin transmitting a packet immediately after the entire packet has been received. With these assumptions, any additional overheads involved in making the routing decision and traversing any additional internal buffers and buses in the router 10 are ignored. Accordingly, only the queuing delay in a single router 10 is considered and all other delays, including the significant propagation delays, which are usually constant, are ignored.

FIG. 3 shows an exemplary simulation, wherein the output link 24 has capacity to transmit ten packets within the 20 ms period of the calls. Each of the ten calls, numbered 1 to 10, has a call phase that determines when the packets from that call will arrive during any 20 ms period. The phase or slot assignment is a discrete value, also from 1 to 10, showing the arrival time of the packet. In the example, calls 2 and 8 arrive during the first slot, no calls arrive during the second slot, call 6 arrives during the third slot, and so on. At the end of the first slot, two packets from calls 2 and 8 are buffered in the voice queue 14. During the next time slot, packet 2 is transmitted on the output link 24 with a delay of one slot, no new packets arrive, and packet 8 is the only packet left in the voice queue 14. The queue contents, transmission schedule, and packet delays are shown for the rest of the voice packets for one period. The maximum queue length is four and occurs twice, during slots 5 and 6. The maximum packet delay is also four because of the FCFS scheduling discipline and is incurred by packets 5 and 1, which are last in the queue during slots 5 and 6. The illustrated example shows only one period of packet arrivals. The arrival pattern repeats; however, it can be shown that the maximum queue length for the voice queue 14 is found by simulating the first two periods, after which the queue contents and transmission schedule repeat. In this example, the maximum queue length for the voice queue 14 is found during the first period.

Table 1 shows the results of the simulation for $10^7$ frames of traffic through a single router 10. A frame of traffic is determined by the set of phases of the N calls being transmitted through the router 10. The simulation for 100, 1,000, and 10,000 voice channels corresponds to VoIP over 10 Mbps, 100 Mbps and Gigabit Ethernet, respectively, running at 100% utilization. These capacity numbers are derived with standard voice/RTP/UDP/IP/802.3 encapsulation with no header compression. For 100 voice channels, the worst-case queue length is 100 packets, and the worst-case delay is 20 ms. The largest queue length required for the 107 frames of traffic generated in the simulation was 30 packets, and 30 packets corresponds to a queuing delay of approximately 5.9 ms. For 1,000 channels, the required queue length increased to 104, but compared to the 100 channel simulation, the ratio of required queue length to worst-case queue length goes down from 30% to approximately 10% (104/1000). Because the transmission rate increased by a factor of 10 and the required queue length went up by a factor of 3.4, the delay goes down from 5.9 ms to 2 ms. Similar results can be seen as the link speed increases to 10,000 channels.

TABLE 1

|  | 10 Mbps Eth | 100 Mbps Eth | 1 Gbps Eth |
|---|---|---|---|
| # channels | 100 | 1,000 | 10,000 |
| Queue length | 30 | 104 | 299 |
| Delay | 5.9 ms | 2 ms | 590 µs |

Simulation results for $10^7$ frames of 20 ms-period VoIP traffic

There are two problems with the simulation technique described above. First, the $10^7$ frame simulation for 10,000 channels generates $10^{11}$ packets and therefore yields a failure probability rate of approximately $10^{-9}$ to $10^{-10}$, which is not low enough for a carrier-grade telecommunications system. Since the 10,000-channel simulation takes almost two days to run, it is clearly not feasible to generate several orders of magnitude more frames. Similarly, the simulation technique does not scale to faster link speeds such as 10

Gigabit Ethernet and the faster SONET technologies. The second problem with the simulation technique is the results depend on the assignment of phases by a random number generator and do not provide any rigorous bounds on system failure rates. A statistical analysis of the problem is now provided.

To statistically model the above-described simulation, we observe from FIG. 3 that the queue requirement is related to the number of packet arrivals in some interval of length $\delta$. For convenience, assume $\Delta=\delta/\tau$ to be the length of the interval $\delta$ normalized to the packet transmission time $\tau$. From the example in the simulation of FIG. 3 and shown in FIG. 4, the interval of length $\Delta=4$ consisting of slots three through six has seven arrivals. Thus, three ($\Delta-1$) packets out of the seven are transmitted in this interval, so the remaining packets queued in the router 10 at the end of slot six is four.

Reference is made to W. Feller, *An Introduction to Probability Theory and Its Applications*, $3^{rd}$ Edition, Vol. 1, Wiley (New York), 1968, which is incorporated by reference in its entirety, for a description of the probability theory used herein. Initially, Y is defined to be the random variable representing the number of packet arrivals in an interval of length $\Delta$ where the total number of slots is N, and the total number of packet arrivals in the N slots is also N. The probability density function (pdf) for Y is given by the binomial distribution:

$$Y: p(y) = B(n, p, y) = \binom{n}{y} p^y q^{n-y} \neq \frac{n!}{(n-y)! y!} p^y q^{n-y}, \quad \text{Eq. 3}$$

where p(y) is the probability of exactly y arrivals in the interval $\Delta$; n=N; p is the probability that a single packet arrives during the interval $\Delta$ and is given by p=$\Delta$/N; and q=1-p. The mean and variance of the binomial distribution are $\mu$=np and $\sigma^2$=np(1-p). Substituting p=$\Delta$/N gives:

$$\mu = np = \Delta, \quad \text{Eq. 4}$$

which simply says that the expected number of packet arrivals in an interval of length $\Delta$ is $\Delta$; and $$\sigma^2 = np(1-p) = \Delta - \frac{\Delta^2}{N}. \quad \text{Eq. 5}$$

Next, Q is defined to be the random variable representing the queue length at the end of an interval of length $\Delta$. Assuming that the queue length at the beginning of the interval is 0, the pdf for Q is given by:

$$Q: p(q) - \# \text{ of packet arrivals} - \# \text{ of packets transmitted,}$$
$$\text{or } Q: p(q) = Y - \Delta. \quad \text{Eq. 6}$$

The number of packets transmitted in an interval of length $\Delta$ is actually $\Delta-1$ if the queue is empty at the beginning of the interval, but an extra packet transmission is added into the equations, as it simplifies the subsequent analysis.

The random variable Q is simply the random variable Y shifted towards the origin by its mean $\Delta$ so that the mean of Q is $\mu$=0 and its variance is the same as the variance of Y given in Equation 5. Physically, the range of values Y can assume is in [0,n] and the range of values Q assumes is in [0-$\Delta$, n-$\Delta$], some of which are negative. Clearly, a queue length cannot be negative, but only the right tail of the distribution of Q, which is always positive, is of interest and represents the pdf of the queue length in the simulation experiment.

The cumulative distribution function (CDF) of Y is the probability that Y$\leq$y, and is given by:

$$F(y) = P[Y \leq y] = \sum_{k=-\infty}^{y} p(k) = \sum_{k=0}^{y} p(k). \quad \text{Eq. 7}$$

Similarly, the CDF of Q is given by:

$$F(q) = P[Q \leq q] = \sum_{k=-\infty}^{q} p(k) = \sum_{k=-\Delta}^{q} p(k). \quad \text{Eq. 8}$$

Bounding the queue length with failure probability f can be accomplished by finding, over all values of $\Delta$, the minimum value of q such that $F(q)\leq 1-f$, the pseudocode of which is shown below.

Algorithm 1

```
for Δ = 1 to n {
    F[Δ] = 0;
    for y = 0 to n {
        F[Δ] = F[Δ] + B(n,Δ/n,y);
        if (F[Δ] > 1 - f) {
            q[Δ] = y;
            break;
        }
    }
}
return max of all {q[Δ]} - Δ }
```

The above algorithm runs in time $\theta(n^3)$ due to the loops in the first and third lines and the computation of the binomial probabilities in the fourth line, all of which depend linearly on n. Algorithm 1 provides a statistical bound on the failure probability f, which the direct simulation method does not. The statistical algorithm also runs much faster than the simulation for most problems of interest. The given statistical method can be improved in two ways, however. First, it is not necessary to examine all values of $\Delta$.

Lemma 1:

For a given failure probability f, the maximum queue size found by Algorithm 1 occurs at $$\Delta = \frac{n}{2}.$$

Using the standard normal approximation to the binomial distribution:

$$P[Q > q] = P\left[Z > \frac{q - \mu}{\sigma}\right]. \quad \text{Eq. 9}$$

Substituting the mean $\mu$=0 and variance of Q given in Equation 5:

$$P[Q > q] = P\left[Z > \frac{q}{\sqrt{\Delta - \frac{\Delta^2}{n}}}\right].\qquad\text{Eq. 10}$$

For a given value of q, there is a need to find the maximum failure probability for all values of $\Delta$. This occurs when the expression on the right side of the inequality of the standard normal random variable Z has a minimum value, since q is constant when the denominator has maximum value. Differentiating the denominator and setting the derivative equal to zero:

$$\frac{d}{d\Delta}\sqrt{\Delta - \frac{\Delta^2}{n}} = \frac{1}{2}\left(\Delta - \frac{\Delta^2}{n}\right)^{-\frac{1}{2}}\left(1 - \frac{2\Delta}{n}\right) = 0,\qquad\text{Eq. 11}$$

and solving for $\Delta$ gives $\Delta = n/2$.

Using Lemma 1, the following $\theta(n^2)$ algorithm is obtained for finding the required queue size.

---
Algorithm 2
---
$\Delta$ = n/2;
F = 0;
for y = 0 to n {
    F = F + B(n, $\Delta$/n,y);
    if (F > 1 - f)
        return y - $\Delta$;
}

---

Although Algorithm 2 is a great improvement over Algorithm 1, it is still computationally intensive for larger values of n. In addition, accurately computing the individual binomial probabilities becomes more difficult as n gets larger due to the large values of $$\binom{n}{y}$$

and small values of $p^y$ and $q^{n-y}$ in Equation 3.

The queue lengths for larger values of n can now be computed efficiently based on known queue length values for smaller values of n.

Lemma 2

For a given failure probability f, the asymptotic growth rate of the queue size as $n\to\infty$ is $\theta(\sqrt{n})$.

Proof:

$$P[Q > q] = P\left[Z > \frac{q - \mu}{\sigma}\right].\qquad\text{Eq. 12}$$

Letting $q = \mu + k\theta$ gives:

$$P[Q > \mu + k\sigma] = P\left[Z > \frac{\mu + k\sigma - \mu}{\sigma}\right].\qquad\text{Eq. 13}$$

Since $\Delta = n/2$, Equation 5 reduces to $\sigma^2 = n/4$:

$$P\left[Q > \mu + k\sqrt{\frac{n}{4}}\right] = P\left[Z > \frac{\mu + k\sigma - \mu}{\sigma}\right]\qquad\text{Eq. 14}$$

$$P\left[Q > \frac{k}{2}\sqrt{n}\right] = P[Z > k]\qquad\text{Eq. 15}$$

The expression on the right in Equation 15, when applied with the appropriate value of k, yields the desired failure probability f. The left side shows that the value of q required to achieve the failure probability f grows with $\sqrt{n}$. The central limit theorem tells us that as $n\to\infty$, the error in using the normal approximation to the binomial distribution goes to 0.

Corollary 1

For a given failure probability f, the asymptotic growth rate of the queuing delay as $n\to\infty$ is $\theta(1/\sqrt{n})$.

Proof:

The maximum queuing delay is the maximum queue size Q times the individual packet transmission time $\tau$. Since $\tau = b_i/C$ and $C = nb_i/p_i$, the queuing delay grows as $\theta(\sqrt{n}\tau) = \theta(\sqrt{n}p_i/n) = \theta(1/\sqrt{n})$.

Using Lemma 2, the queue size for a problem of size n can be approximated, if the required queue length for some value m<n is known:

$$Q_{desired}(n, f) = Q_{initial}(m, f)\sqrt{\frac{n}{m}}.\qquad\text{Eq. 16}$$

Here $Q_{desired}(n,f)$ is the required queue size for n channels with failure probability f. The value of $Q_{initial}(m,f)$ is to be computed according to Algorithm 2. The approximation given in Equation 16 matches the results given by both the direct simulation and the application of Algorithm 2 even for smaller values of n, i.e., 100<n<1000. For larger values of n where simulation and eventually Algorithm 2 become too expensive, the central limit theorem indicates that the approximation in Equation 16 becomes even more accurate. The results of applying Algorithm 2 and Equation 16 are shown in Table 2 for several common VoP technologies.

TABLE 2

| protocol/link | # voice channels per link | f = $10^{-10}$ queue size (packets) | f = $10^{-10}$ delay | f = $10^{-15}$ queue size (packets) | f = $10^{-15}$ delay |
|---|---|---|---|---|---|
| IP/10 Mbps Eth | 100 | 32 | 6.3 ms | 38 | 7.5 ms |
| IP/100 Mbps Eth | 1K | 101 | 2 ms | 125 | 2.5 ms |

TABLE 2-continued

| protocol/link | # voice channels per link | f = 10⁻¹⁰ queue size (packets) | f = 10⁻¹⁰ delay | f = 10⁻¹⁵ queue size (packets) | f = 10⁻¹⁵ delay |
|---|---|---|---|---|---|
| IP/1 Gbps Eth | 10K | 319 | 628 µs | 395 | 777 µs |
| IP/10 Gbps Eth | 100K | 1008 | 198 µs | 1250 | 246 µs |
| IP/OC-3 | 1800 | 136 | 1.5 ms | 168 | 1.9 ms |
| IP/OC-12 | 7200 | 271 | 750 µs | 337 | 933 µs |
| IP/OC-48 | 28,800 | 542 | 375 µs | 674 | 466 µs |
| IP/OC-192 | 115K | 1084 | 187 µs | 1348 | 233 µs |
| ATM/OC-3 | 2,075 | 146 | 412 µs | 184 | 519 µs |
| ATM/OC-12 | 8,324 | 291 | 205 µs | 368 | 259 µs |
| ATM/OC-48 | 33,320 | 582 | 103 µs | 736 | 130 µs |
| ATM/OC-192 | 133K | 1164 | 51 µs | 1472 | 65 µs |
| ATM/OC-768 | 532K | 2328 | 26 µs | 2944 | 33 µs |

Queue lengths and delays for uniformly distributed voice traffic.

Although equation 16 provides the initial queue size, $Q_{initial}(m,f)$ as being multiplied by $\sqrt{n}/m$, those skilled in the art will recognize that the benefit of the concepts of the present invention may be gained were $Q_{desired}(n,f)$ equal to $Q_{initial}(m,f) \ast (m/m)^X$, where X is approximately 0.5, and typically within a range of 0.3-0.7. Systems may benefit from applications where X<1.

The previous description addresses the router queue size problem where the voice channels' phases were independent and distributed uniformly throughout the period of the call. While these results accurately model the packet generation characteristics of a packet telephone connected substantially directly to a router 10, there are other components of a VoP system that impact this model. As shown in FIG. 5, consider a gateway 30 that converts between a TDM voice transmission system (e.g., a T1, T3, or TDM SONET) and a packet network. The 8-bit voice samples (S) arrive at the gateway 30 on the TDM side in 125 µs frames, and each channel's samples arrive exactly every 125 µs, in other words at the same relative time within each frame. The samples (S) are buffered in the gateway 30 until enough samples (S) have been collected to fill the packet payload. The packet (P) is then sent to its destination via the packet network. Assume that the gateway 30 is designed so that the packetization process is clocked on 125 µs boundaries, that is, at the end of each TDM frame, the gateway 30 checks to see if each channel's packet (P) is full and if so transmits each packet (P) one after another for delivery to the router 10 over input links 18.

To model this emission pattern, the period of the TDM frames is defined to be $p_{tdm}$ and the number of TDM frames within the time interval δ is defined to be $$h(\delta) = \left[\frac{\delta}{p_{tdm}}\right],$$

assuming that $\delta > p_{tdm}$. Assume that the TDM frame in which a channel's packet becomes full is random and uniformly distributed among the $h(p_i)$ TDM frames. If all the gateways 30 connected to a router 10 are synchronized to a common clock, as is likely to be the case, the distribution $Y_{gw}$ of the N calls over an interval δ is given by the binomial distribution:

$$Y_{gw}:p(y)=B(n,p,y), \quad \text{Eq. 17}$$

where n=N and $p=h(\delta)/h(p_i)$. Note that this equation is the same as Equation 3 when the intervals δ and $p_i$ are multiples of $p_{tdm}$, but is different otherwise.

The definition of the random variable $Q_{gw}$ that represents the desired queue length is:

$$Q_{gw}:p(q)=\text{\# of packet arrivals}-\text{\# of packets transmitted, or } Q_{gw}:p(q)=Y_{gw}-\Delta. \quad \text{Eq. 18}$$

The key to finding the required queue length for this equation lies in the choice of the interval δ. Following a similar derivation for the choice of Δ, δ should be chosen so p=1/2 in the binomial probabilities, i.e., $\delta=p_i/2$ so $\Delta=N/2$. But since the packet arrivals in any TDM frame of length $p_{tdm}$ occur at the beginning of the frame, the maximum queue length is found by choosing δ to occur just after the nearest TDM frame boundary, i.e., at $\delta=\lfloor h(p_i)/w \rfloor p_{tdm}+\epsilon$ or $\delta=\lceil h(p_i)/2 \rceil p_{tdm}+\epsilon$.

Another way to look at these equations is to note that the number of arrivals in the computation of $Y_{gw}$ is over one more TDM frame than the computation of the number of packets transmitted Δ. So, the same result is obtained by computing the number of arrivals over half the period $p_i$ according to the uniform distribution. For clarity, Y from Equation 3 is renamed as $Y_{uniform}$. Instead of subtracting Δ packet transmissions as in Equation 6, the number of packets transmitted is Δ less the number of packets transmitted in a single TDM frame, which is equal to $p_{tdm}/\tau=p_{tdm}C/b_i$. As such, the required queue size in the TDM gateway modulated voice traffic is related to the required queue size in the uniformly distributed voice traffic as:

$$Q_{gw}(n,f) = Y_{uniform} - \left(\Delta - C\frac{P_{tdm}}{b_i}\right); \quad \text{Eq. 19}$$

$$Q_{gw}(n,f) = Q_{uniform}(n,f) + C\frac{P_{tdm}}{b_i}. \quad \text{Eq. 20}$$

Again, C is the transmission capacity for the output link 24, $p_{tdm}$ is the period of a TDM frame, and $b_i$ is the number of bits in each packet. Further, n is the number of voice channels for the desired rate, and m is the number of voice channels for the initial estimation. The failure probability, f, remains the same. Thus, for non-uniformly distributed packets, the queue size estimates of Equation 16 are modified with a constant, which increases linearly with transmission capacity.

Table 3 shows the queue lengths and delays for TDM-gateway-modulated voice traffic for several of the ATM/SONET link technologies. These numbers should be compared to those for the non-modulated voice traffic shown in Table 2. The required queue length for the modulated traffic is higher than for the non-modulated traffic by the number of packets transmitted in one TDM frame. Note that this number grows linearly as the transmission rate C on the link increases.

TABLE 3

| protocol/link | # voice channels per link | f = 10⁻¹⁰ queue size (packets) | f = 10⁻¹⁰ delay | f = 10⁻¹⁵ queue size (packets) | f = 10⁻¹⁵ delay |
|---|---|---|---|---|---|
| ATM/OC-3 | 2,075 | 191 | 539 µs | 229 | 646 µs |
| ATM/OC-12 | 8,324 | 469 | 330 µs | 546 | 385 µs |
| ATM/OC-48 | 33,320 | 1291 | 228 µs | 1445 | 256 µs |
| ATM/OC-192 | 133K | 3998 | 175 µs | 4306 | 189 µs |

TABLE 3-continued

| protocol/link | # voice channels per link | f = 10$^{-10}$ queue size (packets) | f = 10$^{-10}$ delay | f = 10$^{-15}$ queue size (packets) | f = 10$^{-15}$ delay |
|---|---|---|---|---|---|

Queue lengths and delays for TDM-gateway modulated voice traffic

Those skilled in the art will recognize improvements and modifications to the preferred embodiments of the present invention. All such improvements and modifications are considered within the scope of the concepts disclosed herein and the claims that follow.

What is claimed is:

1. A routing device comprising:
   a) an input interface for receiving packets over a plurality of input links;
   b) an output interface for transmitting packets over an output link; and
   c) a control system associated with the input and output interfaces and adapted to route select packets received via the input interface to the output interface, the control system comprising a queue for buffering the select packets as necessary prior to routing, the queue having a length of $Q_{desired}(n,f)$ to provide n desired voice channels over the output link with a failure probability, f, wherein $Q_{desired}(n,f)=Q_{initial}(m,f)*(n/m)^x+$a constant; $0<x<1$; $Q_{initial}(m,f)$ is a queue length to provide m voice channels over the output link with the failure probability, f; and n>m.

2. The routing device of claim 1 wherein n is at least an order of magnitude greater than m.

3. The routing device of claim 1 wherein x is between about 0.3 and 0.7.

4. The routing device of claim 1 wherein x is around about 0.5.

5. The routing device of claim 1 wherein the constant is approximately zero.

6. The routing device of claim 1 wherein the constant is approximately $C(p_i/b_i)$; C is a transmission capacity of the output link; $p_i$ is a period for each of the select packets; and $b_i$ is a number of bits in each of the select packets.

7. The routing device of claim 1 wherein the routing device is an asynchronous transfer mode (ATM) switch, and the select packets are ATM cells.

8. The routing device of claim 1 wherein the routing device is an internet protocol (IP) router, and the select packets are IP packets.

9. The routing device of claim 1 wherein the select packets are voice packets, the queue is a voice queue, and the control system further comprises a data queue and classification logic adapted to direct voice packets to be transmitted over the output link to the voice queue and data packets to be transmitted over the output link to the data queue.

10. The routing device of claim 9 wherein the control system further comprises scheduling logic adapted to schedule the voice and data packets for transmission, the voice packets being scheduled prior to the data packets.

11. A method for determining the size of a routing queue in a routing device capable of routing select packets received on input links over an output link and having an input interface for receiving packets over a plurality of input links, an output interface for transmitting packets over the output link, and a control system associated with the input and output interfaces, the method comprising:
   a) determining an initial queue length, $Q_{initial}(m,f)$, where $Q_{initial}(m,f)$ is a first length to provide m voice channels over an output link with the failure probability, f; and
   b) determining a desired queue length, where $Q_{desired}(n,f)$, $Q_{desired}(n,f)$ is a second length to provide n voice channels over the output link wherein the failure probability, f, equals $Q_{initial}(m,f)*(n/m)^x+$a constant; where $0<x<1$ and n>m.

12. The method of claim 11 wherein n is at least an order of magnitude greater than m.

13. The method of claim 11 wherein x is between about 0.3 and 0.7.

14. The method of claim 11 wherein x is around about 0.5.

15. The method of claim 11 wherein the constant is approximately zero.

16. The method of claim 11 wherein the constant is approximately $C(p_i/b_i)$; C is a transmission capacity of the output link; $p_i$ is a period for each of the select packets; and $b_i$ is a number of bits in each of the select packets.

17. The method of claim 11 wherein the routing device is an asynchronous transfer mode (ATM) switch, and the select packets are ATM cells.

18. The method of claim 11 wherein the routing device is an internet protocol (IP) router, and the select packets are IP packets.

19. The method of claim 11 wherein the select packets are voice packets, and the queue is a voice queue.

20. A routing device comprising a memory, said memory comprising a routing queue, said routing queue having a length of $Q_{desired}(n,f)$ to provide n desired voice channels over an output link with a failure probability, f, wherein $Q_{desired}(n,f)=Q_{initial}(m,f)*(n/m)^x+$a constant; $0<x<1$; $Q_{initial}(m,f)$ is a queue length to provide m voice channels over the output link with the failure probability, f; and n>m.

21. The routing device of claim 20 wherein n is at least an order of magnitude greater than m.

22. The routing device of claim 20 wherein x is between about 0.3 and 0.7.

23. The routing device of claim 20 wherein x is around about 0.5.

24. The routing device of claim 20 wherein the constant is approximately zero.

25. The routing device of claim 20 wherein the constant is approximately $C(p_i/b_i)$; C is a transmission capacity of the output link; $p_i$ is a period for select packets; and $b_i$ is a number of bits in each of the select packets.

* * * * *